(12) United States Patent
Chittenden et al.

(10) Patent No.: US 6,355,077 B1
(45) Date of Patent: Mar. 12, 2002

(54) AIR FILTER HAVING INTEGRATED SEALING ORIFICE

(75) Inventors: Jonathan R. Chittenden, Sheboygan; Jerry R. Reineking, Cleveland; Todd R. Gerhardt, Grafton, all of WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 09/606,873

(22) Filed: Jun. 28, 2000

(51) Int. Cl.⁷ .............................................. B01D 50/00
(52) U.S. Cl. .................... 55/385.3; 55/493; 55/498; 55/502; 55/504; 123/198 E
(58) Field of Search ................. 55/385.3, 502, 55/503, 493, 498, 504, DIG. 28; 123/198 E (56) References Cited

U.S. PATENT DOCUMENTS

| | | | | |
|---|---|---|---|---|
| 4,215,665 A | * | 8/1980 | Stambaugh | |
| 4,233,043 A | * | 11/1980 | Catterson | |
| 4,292,061 A | * | 9/1981 | Land | |
| 5,049,274 A | * | 9/1991 | Leason et al. | |
| 5,171,430 A | * | 12/1992 | Beach et al. | |
| 5,458,666 A | * | 10/1995 | Miyakata | |
| 5,730,768 A | * | 3/1998 | Kaminaga et al. | 55/385.3 |
| 5,753,117 A | * | 5/1998 | Jiang | 55/502 |
| 5,755,844 A | * | 5/1998 | Arai et al. | 55/502 |
| 5,759,217 A | * | 6/1998 | Joy | 55/502 |
| 5,814,117 A | * | 9/1998 | Mochida | |
| 5,865,863 A | * | 2/1999 | DeSousa et al. | 55/385.3 |
| 5,897,676 A | * | 4/1999 | Engel et al. | 55/502 |
| 5,919,279 A | * | 6/1999 | Merritt et al. | 55/385.3 |
| 6,143,049 A | * | 11/2000 | Gieseke et al. | 55/385.3 |
| 6,159,260 A | * | 12/2000 | Hammes | 55/502 |
| 6,231,630 B1 | * | 5/2001 | Ernst et al. | 55/502 |
| 6,235,073 B1 | * | 5/2001 | Bannister et al. | 55/385.3 |

* cited by examiner

Primary Examiner—David A. Simmons
Assistant Examiner—Minh-Chan T. Pham
(74) Attorney, Agent, or Firm—Quarles & Brady LLP (57) ABSTRACT

An air filtration system for an internal combustion engine is provided wherein the air filter has an exit orifice for sealingly engaging the air intake duct of a carburetor via a friction-fit. The friction-fit provides an integrated seal between the orifice and duct such that additional sealing means are not required. The friction-fit can be provided by a plurality of ridges formed along the interior surface of the orifice or by decreasing the cross-sectional area of the orifice in the direction of the internal cavity formed by the filter walls. Decreasing the cross-sectional area of the orifice is accomplished by providing a plurality of stepped diameters of a bottom surface material or a surface that conically slopes inward towards the cavity. In addition, the air filter can be secured to a platform of an engine by a holding arm having a hook shaped distal end with a catch that can be disengaged by pulling at a grip, thus allowing easy access to the filter for inspection, cleaning, and replacement.

26 Claims, 6 Drawing Sheets

AIR FILTER HAVING INTEGRATED SEALING ORIFICE

CROSS-REFERENCE TO RELATED APPLICATIONS

STATEMENT REGARDING FEDERALLY SPONSORED RESEARCH OR DEVELOPMENT

FIELD OF THE INVENTION

The present invention relates to internal combustion engines, and more particularly to an air filter for use upstream of a carburetor in an internal combustion engine such as would commonly be used in a lawn mower, snow blower, generator, or the like.

DESCRIPTION OF THE BACKGROUND ART

Internal combustion engines convert chemical energy to mechanical and electrical energy for wide varieties of applications. For example, a typical engine converts heat into motive power by burning a mixture of air and a flammable hydrocarbon, such as gasoline, in a cylinder having a moveable piston positioned therein. Linear motion of the piston rotates a crankshaft that transmits power to a rotor such as a connecting rod. The rate at which the piston moves up and down within the cylinder dictates the speed at which the crankshaft rotates, as regulated by a carburetor controlling the air-fuel mixture within the cylinder.

If dirt or dust or other contaminants are drawn into the engine as part of the air-fuel mixture generated by the carburetor, they become a part of the oil film between the engine's moving parts and form an abrasive mixture that is very damaging to the engine. In order to remove solid impurities from an airstream and thus prevent them from entering the engine, an air filtration assembly is commonly positioned upstream of the carburetor in order to filter the air that is delivered to the air intake duct of the carburetor.

As known, many air filtration assemblies employ a filter element in the form of an annulus of porous filter paper that permits air to flow therethrough. As an indispensable adjunct of every internal combustion engine, the filter element must be periodically removed and either cleaned or replaced. The frequency with which this task must be performed depends, in substantial part, upon the environment in which the engine operates.

In some cases, such as in a lawn mower, the engine is partially or totally covered by a housing that is usually made of plastic or other non-conducting material. Typically, separate housings cover the air filtration system and cooling system. Additionally, baffles to direct the air to the engine intake are usually attached to the housings. Each of these housings and baffles require a fastening system, which increases part count and complexity of manufacture and assembly. Typically, the plurality of housings must be disassembled and reattached using tools. Moreover, the housings for the sub-assemblies are often nested beneath the main or other housings, such that multiple housings may have to be removed to access a single sub-assembly. Multiple housings and cumbersome fastening systems render servicing the engine and its sub-assemblies and systems difficult.

Figure 1A:
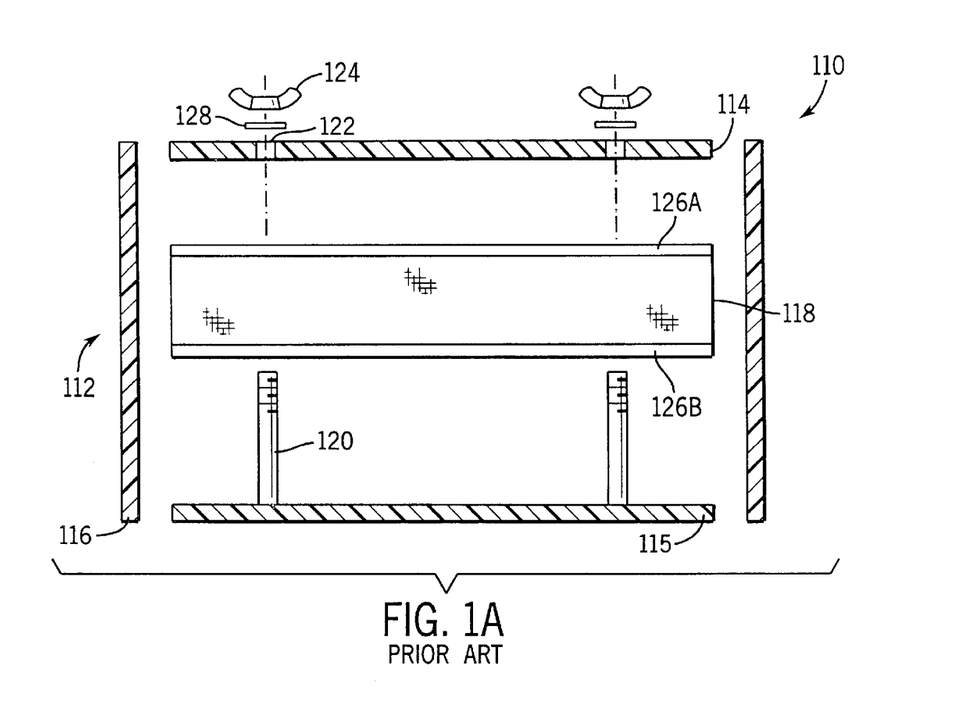
Figure 1B:
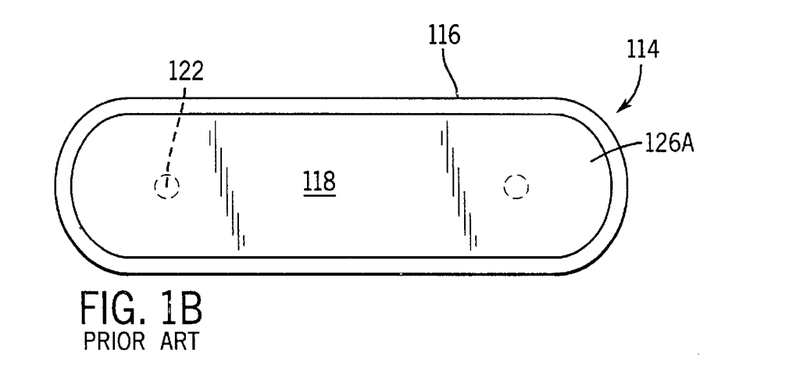

For example, a typical prior art filtration system 110, as depicted in FIGS. 1-A and 1-B, comprises an air cleaner case 112 having a covering top 114, a covering bottom 115, and a continuous sidewall 116 depending from the perimeter of the covering top 114 to the perimeter of the covering bottom 115. In this system 110, an air filter 118 is detachably held in place by a plurality of threaded members 120 that extend up from the covering bottom 115 towards the covering top 114. The covering top 114 has a plurality of orifices 122 for receiving the threaded members 120 and being secured thereto via a fastener mechanism 124 such as a wing-nut. Each fastener mechanism 124 co-acts with a threaded member 120 to draw the covering top 114 and covering bottom 115 towards one another, thereby securing the air filter 118 in the case 112.

To ensure against unfiltered air being drawn into the carburetor, large first and second sealing surfaces 126A–B of the air filter 118 are typically provided for interfacing between the air filter 118 and both the covering top 114 and covering bottom 115. These sealing surfaces 126 are generally provided along the entire top and bottom of the filter 118. In addition, sealing gaskets 128 are frequently placed intermediate the fastener mechanism 124 and covering top 114 to prevent air from being drawn through the orifices 122 of the covering top 114.

The traditional air filtration system 110 thus requires large sealing surfaces 126 and gaskets 128 in order to prevent unfiltered air from being drawn into the engine. These parts 126, 128 demand close tolerances in order for the seals to be effective. Any misassembly, missing parts, slightly warped materials or other non-conformities can cause unfiltered air to enter the engine.

Moreover, to perform a filter change, the fastener mechanism 124 is loosened and removed; the gaskets 128 and covering top 114 are then removed; the air filter 118 is then removed and a new or cleaned filter 118 is inserted; the covering top 114 is repositioned and the threaded members 120 are realigned; and finally, each fastener mechanism 124 is resecured to each corresponding threaded member 120 in order to complete the inspection, replacement, or cleaning of the air filter 118.

As is evident from the foregoing, a need exists for an air filtration system having an air filter that is easier to replace than are the air filters of present design, require fewer parts, and decrease the amount of unfiltered air that is delivered to the air intake duct of the carburetor of an internal combustion engine.

BRIEF SUMMARY OF THE INVENTION

Provided by this invention is an air filter for an internal combustion engine, the filter having a top wall, a sidewall depending from a perimeter of the top wall and including a filter material through which engine intake air flows, and a bottom wall attached to the sidewall and spaced apart from the top wall to form an integral housing that defines a cavity. An orifice extends through the bottom wall and receives the air intake duct of a carburetor in sealing and frictional engagement.

A general object of the invention is to provide a filtration system in which the air filter is easy to change, i.e., requires no tools. Accordingly, the old air filter is pulled free, and simple hand pressure is exerted to fit a new or cleaned filter over the air intake duct of the carburetor. In the preferred embodiment, a friction-fit is provided by the interior surface defined by the orifice, such that the interior surface decreases in cross-sectional area in the direction of the cavity. Preferably, the interior surface comprises a plurality of stepped diameters of a bottom wall material. Alternatively, the interior surface conically slopes inward towards the cavity. In yet another alternative embodiment, the interior surface comprises a plurality of ridges that encircle the air intake duct when the air filter is placed onto the engine.

Another object of this invention is to provide a good seal to prevent contaminants from entering the carburetor. The filter itself is an integral housing in which air can enter the cavity only through the filter material in the sidewall. The filter's only seal is limited to the region of the friction-fit between the air intake tube and the surrounding interior surface formed by the orifice in the bottom wall.

The air filter forms part of an air filtration system in which a holding arm having a hook shaped distal end with a catch extends upward from a carburetor air intake platform in order to hold the filter in place. The catch is received in an indentation formed along a top surface of the top wall of the filter. The catch is disengaged by pulling a grip formed at the top of the holding arm, thus allowing easy removal and replacement of the filter.

The foregoing and other objects and advantages of the invention will appear from the following description. In the description, reference is made to the accompanying drawings which form a part hereof, and in which there is shown, by way of illustration, preferred and alternative embodiments of the invention.

BRIEF DESCRIPTION OF THE SEVERAL VIEWS OF THE DRAWINGS

FIG. 1-A is an exploded side view of a prior art air filter in an air cleaner case;

FIG. 1-B is a top view of the air filter of FIG. 1-A;

DETAILED DESCRIPTION OF THE PREFERRED EMBODIMENTS

Figure 2:
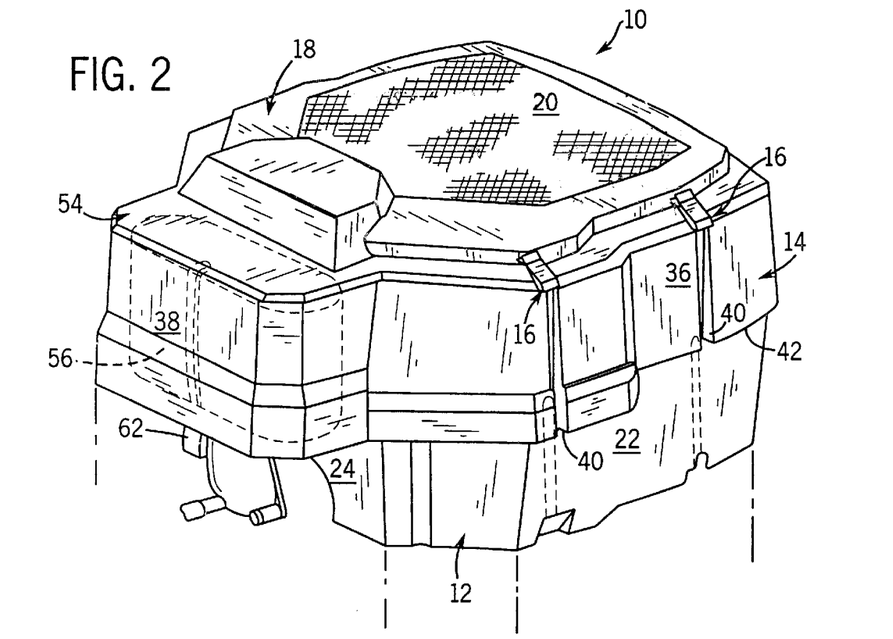
FIG. 2 is a perspective view of an internal combustion engine housing which encloses the preferred embodiment of the air filter.
Figure 4:
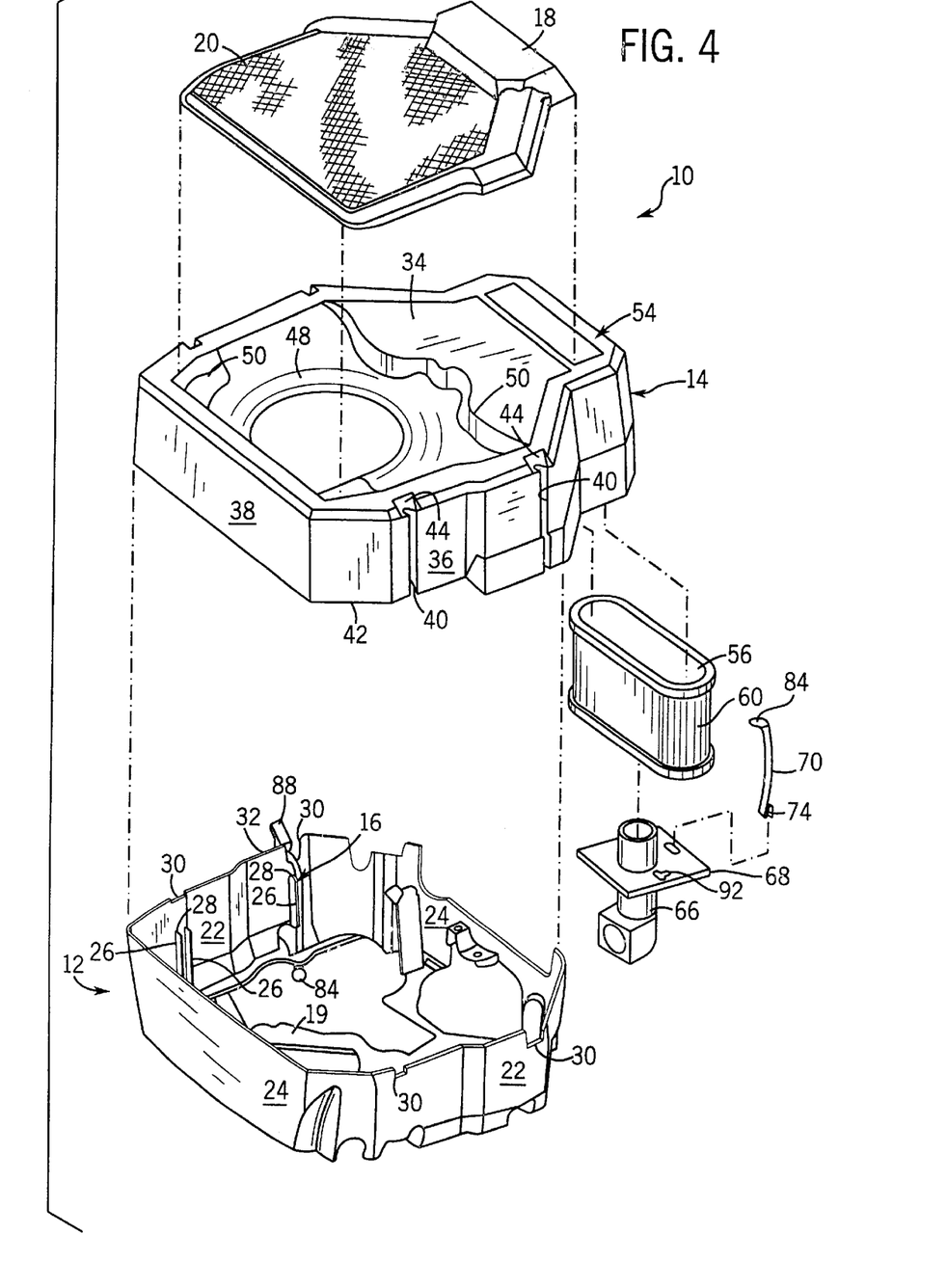
FIG. 4 is an assembly view of the engine housing of FIG. 2 and a preferred embodiment of the air filtration system of this invention.

Referring to FIG. 2, a housing 10 includes an engine cradle 12 defining a cavity for containing an internal combustion engine, not shown. A cover 14 is attached to the cradle 12 by a plurality of straps 16. A bezel 18 snaps onto the cover 14 so as to retain a screen 20. Referring to FIGS. 2 and 4, the cradle 12 is preferably molded of a glass-filled nylon to include a bottom framework 19 and upstanding sidewalls 22 and end walls 24. Each sidewall 22 has two pairs of ridges 26 projecting from their inner surfaces forming slots 28. Above each slot is a notch 30 at a top edge 32 of the sidewall 22. The cover 14 is molded of a glass-filled polypropylene to include a baffle 34 at a top side and sidewalls 36 and end walls 38 extending downwardly along the perimeter of the baffle 34, so sized as to overlap the cradle 12 and encapsulate the engine (not shown). The sidewalls 36 of the cover 14 are formed to include two parallel longitudinal recesses 40, each extending from a bottom edge 42 of the sidewalls 36 to a recessed catch 44. The recesses 40 are positioned to be aligned with the cradle slots 28 when the cover 14 is assembled to the cradle 12.

Figure 3:
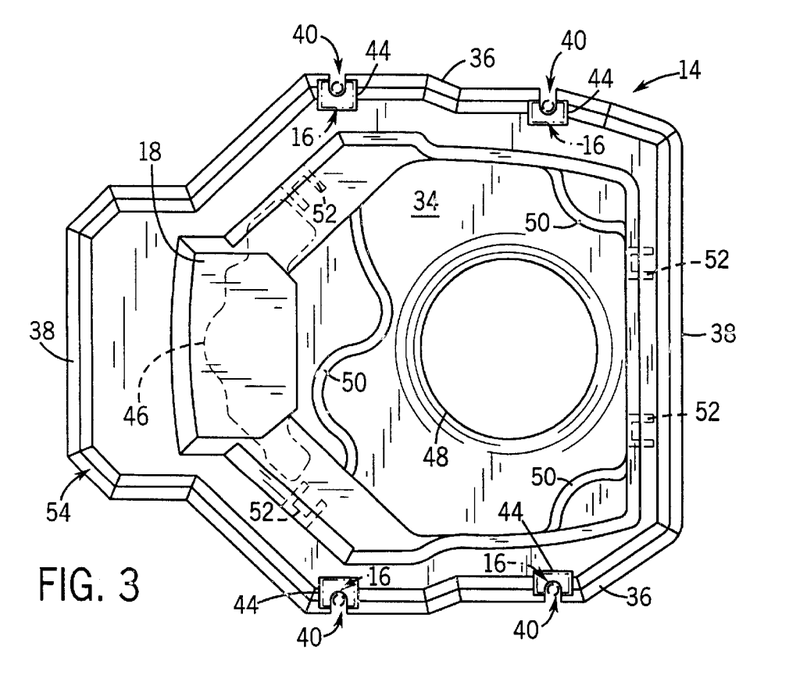
FIG. 3 is a top view of a cover of the engine housing of FIG. 2, shown without a removable bezel and screen.

Referring now to FIGS. 3-4, the cover baffle 34 includes a winged opening 46 (shown in phantom in FIG. 3) providing clearance for a radiator fill neck (not shown) and engine air hoses (not shown). The baffle 34 also forms a smooth convex opening 48 having a preferably circular cross-section. The cross-sectional area of the opening 48 decreases from the outside of the cover 14 towards the inside. This convex opening 48 provides a venturi effect, as known in the art, providing a smooth and essentially not turbulent transitional air flow through the baffle 34. This flow allows the air to be at a relatively high velocity laminar flow as it enters an intake centrifugal fan (not shown), thereby increasing air flow to the carburetor and increasing fan efficiency, as appreciated by those skilled in the art. Smooth, wavy raised surfaces 50 can be formed in the cover 14 around the convex opening 48 to aid in directing the air therethrough.

The screen 20, which is preferably made of a wire mesh, is secured over the convex opening 48 in order to prevent debris from entering the housing 10 and carburetor air intake duct 66. As previously mentioned, the screen 20 is held in place by the bezel 18 and preferably made of a glass-filled polypropylene material. The bezel 18 is snapped onto the cover 14 by four clips 52 (shown in phantom in FIG. 3) integrally formed in the cover 14. The clips 52 can be depressed so as to allow the removal of the bezel 18, and thereby the screen 20, from the cover 14. By removing the screen, easy and direct access is gained to the air filter 56 of the present invention, as will be elaborated upon presently.

Figure 9:
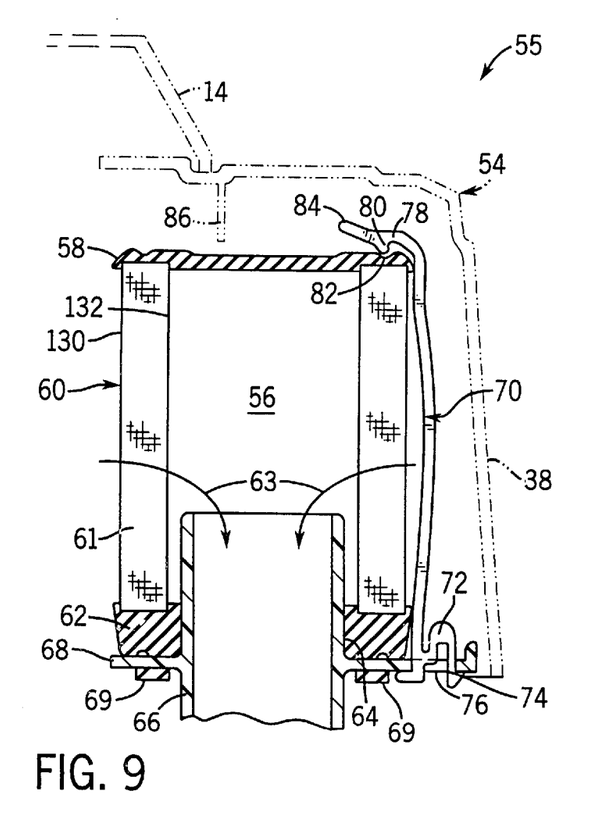
FIG. 9 is a cross-sectional view taken along line 9—9 of FIG. 8.

Referring particularly to FIG. 9, an air filtration system 55 is enclosed in a tabbed end 54 of the cover 14 and includes a removable air filter 56. The air filter 56 is an integral housing that surrounds a cavity. It has a top wall 58 which is a substantially flat structure molded from a urethane-based product. A sidewall 60 is molded to the periphery of the top wall 58 and extends downward therefrom to connect with a bottom wall 62. The bottom wall 62 has substantially the same shape and size as the top wall 58, but it is molded from an elastomeric material as will be described in more detail below. The sidewall 60 includes a filter material 61 through which engine intake air flows. In a preferred embodiment, the filter material 61 is pleated paper and it is sandwiched between an external porous support 130 and an internal porous support 132 such as wire mesh walls. The filter material 61 causes the engine intake air passing into the cavity to be filtered.

The bottom wall 62 is preferably formed from a resilient material such as a urethane-based product and it includes a circular orifice 64 which passes through it. The orifice 64 is sized and shaped to receive an air intake tube 66 on the engine's carburetor (not shown). As will be described in more detail below, the construction of this orifice may take any of a number of different forms which are all designed to perform two functions. First, the interior surface defined by the orifice 64 provides a friction-fit with the outer surface of the air intake duct 66 to provide the primary means for retaining the integral air filter 56 in place. And second, the interior surface defined by the orifice 64 provides an air seal with the outer surface of the air intake duct 66. Indeed, because of the integrally sealed air filter housing, this is the only air seal that needs to be maintained when the filter 56 is put in place. As shown best in FIG. 9 then, during engine operation, the engine intake air is drawn into the air filter cavity through its sidewalls 60, as shown by the arrows 63, and it exits through the carburetor air intake duct 66 that extends into the cavity through the orifice 64. The filter material 61 thus filters the air that is received by the carburetor.

As engine air is drawn through the screen 20, it is drawn into the cavity of the air filter 56 due to the venturi effect created by the convex opening 48 and a separate vacuum effect created by the suction of the downstroke of the pistons within each cylinder. The engine air thus passes through the sidewalls 60 of the air filter 56 and exits the filter 56 via the exit orifice 64 that is located along and extends through the bottom wall 62 of the filter 56. As mentioned, the orifice 64 is positioned and sized to align with the air intake duct 66 of the carburetor, which extends above a platform 68 that supports the air filter 56. The platform 68 is preferably formed at the carburetor elbow in order to eliminate the need for a separate base to support the air filter 56. In the figures, the orifice 64 and air intake duct 66 are shown with circular cross-sectional areas; however, orifices 64 and ducts 66 with other cross-sectional areas, such as elliptical or square, are also contemplated.

Specifically, the orifice 64 sealingly engages the air intake duct 66 via a friction-fit therebetween. Significantly, the friction-fit between the orifice 64 and air intake duct 66 provides an integrated seal between the cavity and air intake duct 66 such that additional sealing means, such as of-rings and the like, are not required in order to prevent unfiltered air from being drawn into the carburetor. Rather, hand pressure is exerted to fit the filter 56 over the duct 66, the air intake duct 66 being sized to fit within the orifice 64. No tools are required to secure or unsecure this friction-fit.

This friction-fit provides the primary seal between the orifice 64 and air intake duct 66. Significantly, a sealing surface running the entire length of the bottom wall 62 is not required. However, a secondary seal may be provided by molding a raised ring 69 of the bottom wall material about the perimeter of the orifice 64 on the external surface of the bottom wall 62, the raised ring 69 providing a secondary sealing surface therearound the orifice 64 to function as a dirt-shield and prevent fringe particles of debris from being drawn into the carburetor when the air filter 56 is used on the engine.

Figure 5:
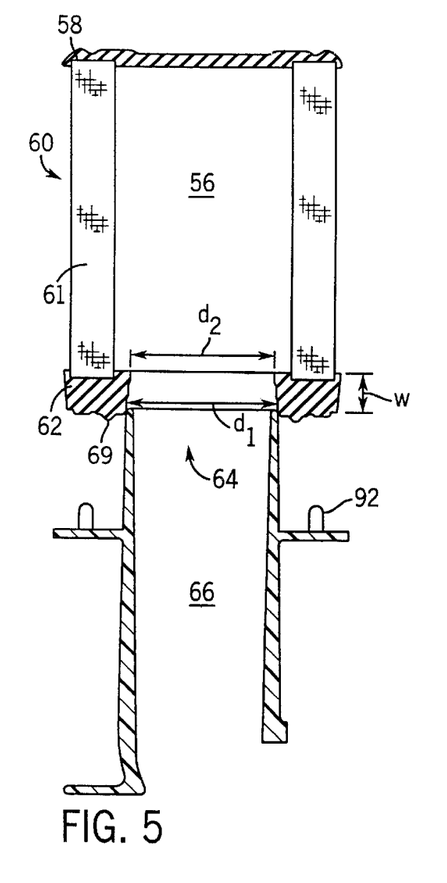
FIG. 5 is a view in cross section of the air filter according to the preferred embodiment of the present invention.
Figure 6:
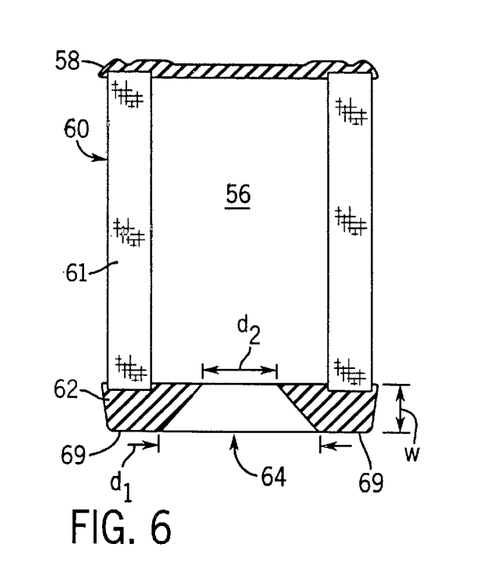
FIG. 6 is a view in cross section of the air filter according to an alternative embodiment of the present invention.

Referring now to FIGS. 5–6, the bottom wall 62, of a width w, can be formed whereby the cross-sectional area of an interior surface defined by the orifice 64 decreases in a direction that can be described as internally towards the cavity. In other words, the interior surface of the orifice 64 is preferably formed with an inwardly decreasing diameter towards the cavity. For example, as shown in the preferred embodiment in FIG. 5, the interior surface of the orifice 64 can comprise a plurality of stepped diameters of the bottom wall material, the diameters decreasing in the direction of the cavity such that an external diameter $d_1$ is greater than an internal diameter $d_2$. The stepped diameters provide a plurality of integral sealing surfaces for sealingly engaging the air intake duct 66. In this preferred embodiment, the resilient nature of the bottom wall 62 permits the diameters of bottom wall material to abut the intake duct 66 in various degrees of compression, the smaller diameters (i.e., $d_2$) undergoing the greatest amounts of compression and thereby providing the greatest degree of sealing force when the intake duct 66 is inserted into the orifice 64. In the preferred embodiment shown in FIG. 5, the air filter 56 is shown just before it slides onto the intake duct 66, and thus, the interior surface of the orifice 64 is shown in an undeformed state. FIG. 9, on the other hand, illustrates the interior surface of the orifice 64 shown in the deformed state as described above.

Figure 7:
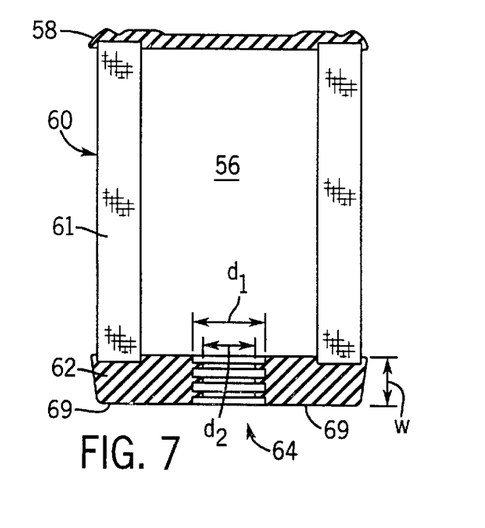
FIG. 7 is a view in cross section of the air filter according to another alternative embodiment of the present invention.

In an alternative embodiment depicted in FIG. 6, the interior surface of the orifice 64 can comprise a surface that conically tapers inward towards the cavity with $d_1 > d_2$. Or in another alternative embodiment depicted in FIG. 7, the orifice 64 can comprise a plurality of ridges formed along the interior surface of the orifice 64, the ridges functioning as a plurality of integral of-rings.

Whether the friction-fit is embodied as a plurality of ridges, a plurality of stepped diameters, or as a conically sloped surface, all are integral with and formed of the same material as the bottom wall 62 of the filter 56. In addition, the most exterior diameter of material (i.e., $d_1$) may be sized appreciably greater than the diameter of the intake duct 66 to assist the installer in getting the exit orifice 64 positioned over and started on the intake duct 66, the appreciably greater diameter thus functioning primarily as guide to installation.

Figure 8:
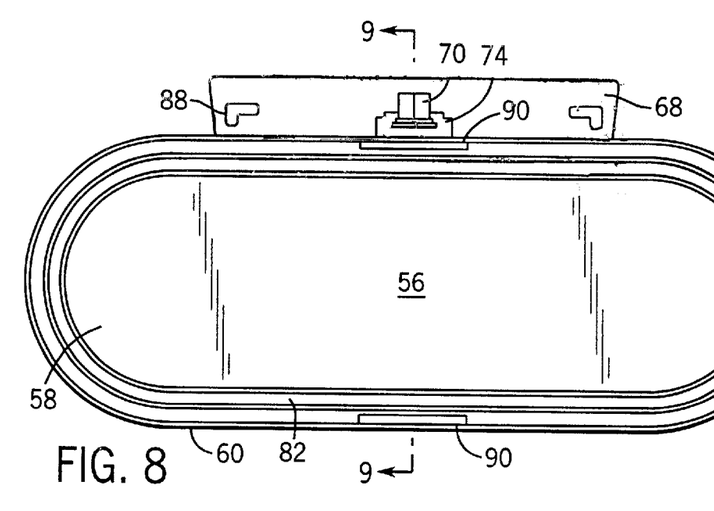
FIG. 8 is a top view of the preferred embodiment of the air filtration system according to the present invention.
Figure 10:
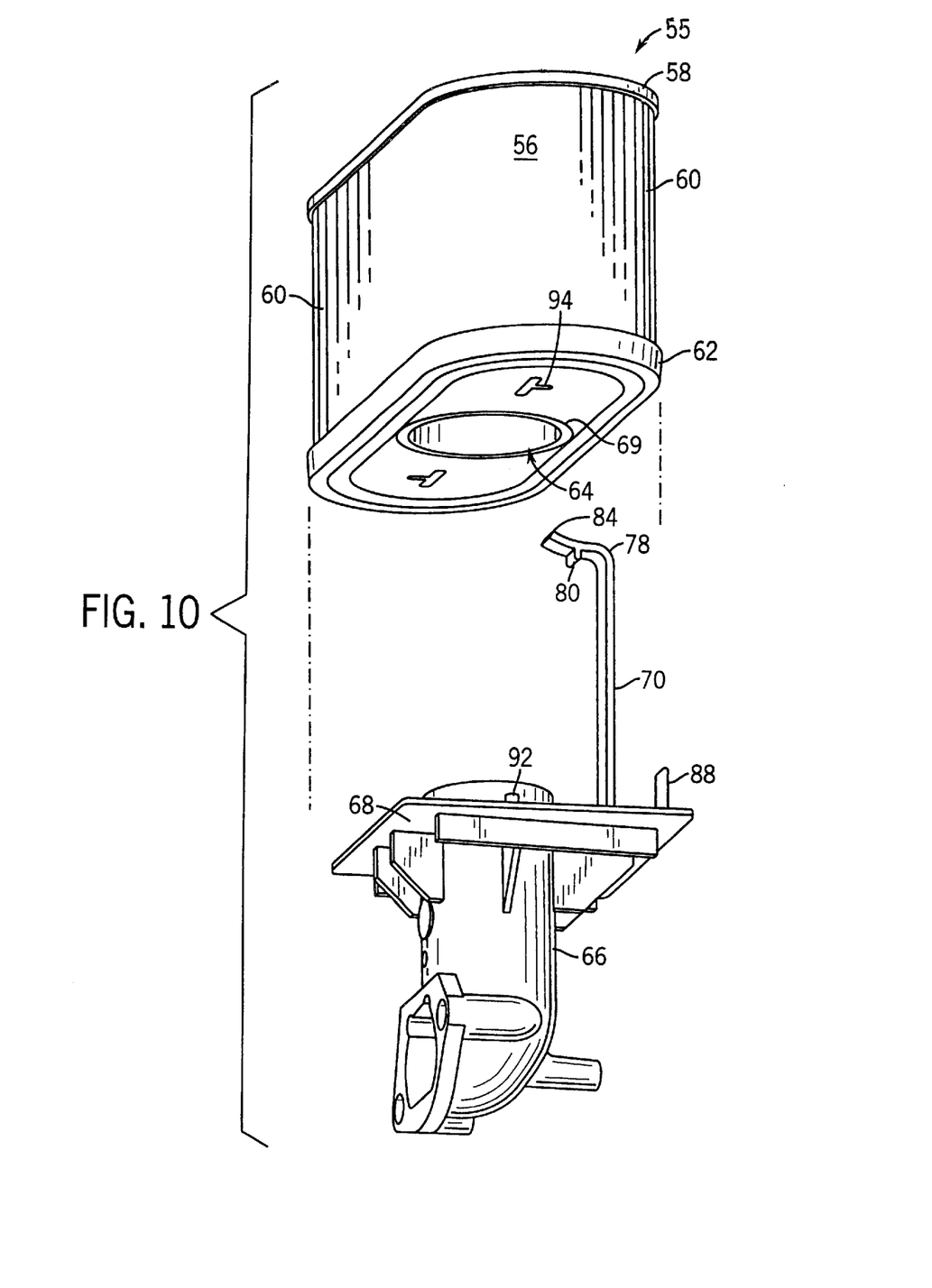
FIG. 10 is an exploded top perspective view of the air filtration system of FIG. 8.

Maximum filtered air is exchanged between the exit orifice 64 and air intake duct 66 when the later is fully inserted into the former. In other words, it is preferred that the bottom wall 62 of air filter 56 make physical contact with the platform 68. To visually ensure that the bottom wall 62 is flush with the platform 68, a holding arm 70, depicted in FIGS. 8–10, can be attached to the engine at a bottom end and have a hook shaped distal top end 78. More specifically, the bottom end of the arm 70 preferably makes contact with the platform 68 via a tab 74 and slot 76 arrangement and the top end 78 is hook shaped and comprises a catch 80 to engage an indentation formed along a top surface of the top wall 58 of the air filter 56. Preferably, the catch 80 can be disengaged by pulling at a grip 84 at the top end 78 of the arm 70. In a preferred embodiment, the holding arm 70 is made of an elastomeric material, such as a suitable rubber or plastic, and can curve longitudinally out from a vertical axis extending therethrough so as to assist the engagement and disengagement of the catch 80 with the indentation 82. Thus, when the bottom wall 62 of the air filter 56 rests on the platform 68, an installer will know that air filter 56 is properly positioned because only then will the catch 80 be able to engage the indentation 82. In addition, the downwardly depending catch 80 may exert additional downward pressure on the raised ring 69 of bottom wall material resulting in additional compression thereof, the additional pressure further engaging the secondary seal as previously discussed.

Also in a preferred embodiment, as depicted in FIG. 9, the cover 14 can be formed to include a downwardly depending wall 86 positioned above the air filter 56 when the cover 14 is assembled to the cradle 12. The wall 86 acts as a secondary restraint for restricting upward movement of the air filter 56. In addition, the platform 68 can be formed to include a plurality of upwardly depending positioning pins 88 to prevent rotational movement of the air filter 56 about the holding arm 70 when it is properly positioned on the platform 68. Also, the platform 68 may be formed with a plurality of upwardly depending indexing pins 92 for alignment with a respective receiving orifice 94 formed within the bottom wall 62 of the air filter 56. In a preferred embodiment, symmetrical indexing pins 92 allow the installer to properly position the air filter 56 over the orifice 64 only when the indexing pins are in alignment with the receiving orifices 94, yet do not limit the orientation of the filter 56 upon installation thereof. Although the indexing pins 92 and receiving orifices are preferably formed as T-shaped in cross-section, other geometric shapes for additionally securing the air filter 56 in place could, of course, also be used.

Also in a preferred embodiment, the indentation 82 can be continuous along the exterior surface of the top wall 58 in order to allow the air filter 56 to be positioned on the platform 68 with either longitudinal sidewall 60 placed adjacent to the holding arm 70. Additionally, the perimeter of the top wall 58 of the air filter 56 can be formed with a plurality of notches 90 to assist the engagement and disengagement of the catch 80 from the indentation 82.

Thus, the present invention provides an improved air filtration system 55 in a which a reduced sealing surface is provided by the exit orifice 64 which sealingly engages the air intake duct 66 of the carburetor, thereby decreasing the amount of unfiltered air that is delivered to the engine. All sealing surfaces are integral to the bottom wall 62 of the filter 56. At the same time, the removable air filter 56 is adapted to be put in place and removed expeditiously without a need for tools or loosening and re-securing a fastener mechanism 124 to a top cover 114.

While there has been shown and described what are at present considered the preferred embodiments of the invention, it will be obvious to those skilled in the art that various changes and modifications can be made therein without departing from the scope of the invention.

What is claimed is:

1. An air filter for an internal combustion engine configured to engage at its downstream end a platform supporting an air intake duct extending outwardly therefrom, the filter comprising:
   a top wall;
   a sidewall depending from a perimeter of the top wall and including a filter material through which engine intake air flows; and
   a bottom wall attached to the sidewall and spaced apart from the top wall to form an integral housing that defines a cavity, the bottom wall having (1) an orifice extending therethrough for receiving in sealing and frictional engagement the air intake duct, and (2) an outer surface for engaging the platform having a plurality of receiving orifices for receiving a corresponding plurality of indexing pins extending from the platform for fixing the radial orientation of the filter with respect to the platform.

2. The air filter of claim 1 wherein the bottom wall includes an integrally molded ring disposed on the outer surface of the bottom wall and circumscribing the orifice for providing a sealed interface with the platform.

3. The air filter of claim 1 wherein the orifice defines an interior surface passing through the bottom wall and the interior surface comprises a plurality of ridges that encircle the air intake duct when the bottom wall engages the platform.

4. The air filter of claim 1 wherein the interior surface defined by the orifice decreases in cross-sectional area in the direction of the cavity.

5. The air filter of claim 4 wherein the interior surface comprises a plurality of stepped diameters of a bottom wall material.

6. The air filter of claim 4 wherein the interior surface conically slopes inward towards the cavity.

7. An air filter for an internal combustion engine configured to engage at its downstream end a platform supporting an air intake tube extending outwardly therefrom, the filter comprising:
   a top wall;
   a sidewall depending from a perimeter of the top wall and including a filter material through which engine intake air flows;
   a bottom wall attached to the sidewall and spaced apart from the top wall to form an integral housing that defines a cavity, the bottom wall having (1) an orifice extending therethrough that defines an interior surface that has an inwardly decreasing cross-sectional area in the direction of the cavity, and (2) a seal disposed on the lower surface thereof to produce a sealed engagement with the platform; wherein
   the top wall includes an indentation formed along a top surface thereof for receiving a catch of a hook arm extending from the platform operable to retain the air filter in place with respect to the platform.

8. The air filter of claim 7 wherein a plurality of notches are formed around the perimeter of the top wall for assisting engagement and disengagement of the catch from the indentation.

9. The air filter of claim 7 wherein the filter material is a pleated paper sandwiched between an internal porous support and an external porous support.

10. The air filter of claim 7 wherein the seal comprises a ring integrally molded with the bottom wall that surrounds the orifice to provide a seal with the platform.

11. The air filter of claim 7 wherein the bottom wall includes a plurality of receiving orifices for reception of a respective plurality of indexing pins extending from the platform.

12. The air filter of claim 7 wherein the bottom wall is formed from a resilient material.

13. The air filter of claim 7 wherein the bottom wall is a urethane-based product.

14. The air filter of claim 7 wherein the interior surface comprises a plurality of stepped diameters of a bottom wall material, the diameters decreasing in the direction of the cavity.

15. The air filter of claim 7 wherein the interior surface conically slopes inward towards the cavity.

16. An air filtration system for an internal combustion engine, the system comprising:
   an air intake assembly of an engine including:
      (i) an elongated platform having a plurality of locating pins extending outwardly therefrom; and
      (ii) an air intake duct extending through an opening formed in the platform; and
      (iii) a holding arm attached to the platform at one end, and having a hook shaped distal end with a catch; and
   an air filter including;
      (i) a top wall including an indentation formed along a top surface thereof for receiving the catch of the hook arm so as to prevent relative movement between the filter and the platform;
      (ii) a sidewall depending from a perimeter of the top wall and including a filter material through which engine intake air flows; and
      (iii) a bottom wall attached to the sidewall and spaced apart from the top wall to form an integral housing that defines a cavity, the bottom wall having (1) an orifice extending therethrough for coupling the cavity to the air intake duct, and (2) a corresponding plurality of apertures sized to received the plurality of locating pins so as to prevent relative movement between the filter and the platform.

17. The air filtration system of claim 16 wherein a plurality of notches are formed around the perimeter of the top wall for assisting engagement and disengagement of the catch from the indentation.

18. The air filtration system of claim 16 wherein the filter material is a pleated paper sandwiched between an internal porous support and an external porous support.

19. The air filtration system of claim 16 wherein the bottom wall includes an integrally molded ring that surrounds the orifice to provide a seal between the filter and the platform.

20. The air filtration system of claim 16 wherein the bottom wall is formed from a resilient material.

21. The air filtration system of claim 16 wherein the bottom wall is a urethane-based product.

22. The air filtration system of claim 16 wherein the orifice sealingly engages the air intake duct of the carburetor.

23. The air filtration system of claim 16 wherein the orifice defines an interior surface that has an inwardly decreasing cross-sectional area in the direction of the cavity.

24. The air filtration system of claim 23 wherein the interior surface comprises a plurality of stepped diameters of a bottom wall material, the diameters decreasing in the direction of the cavity.

25. The air filtration system of claim 23 wherein the interior surface conically slopes inward towards the cavity.

26. The air filtration system of claim 16 wherein the orifice defines an interior surface that comprises a plurality of ridges that encircle the air intake duct when the air filter is used on the engine.

* * * * *